US006347772B1

(12) United States Patent
L'Hotel

(10) Patent No.: US 6,347,772 B1
(45) Date of Patent: Feb. 19, 2002

(54) FOLDING DISPLAY UNIT

(76) Inventor: François L'Hotel, 70, rue Joseh de Maistre, 75018-Paris (FR)

( * ) Notice: Subject to any disclaimer, the term of this patent is extended or adjusted under 35 U.S.C. 154(b) by 0 days.

(21) Appl. No.: 09/391,812

(22) Filed: Sep. 8, 1999

(51) Int. Cl.[7] ................................................ F16M 11/00
(52) U.S. Cl. ........................ 248/174; 211/73; 206/45.24
(58) Field of Search ................................ 248/174, 152; 211/72–73; D9/433, 346, 455; 40/672, 539, 738, 743; 206/730, 764, 45.21, 45.25

(56) References Cited

U.S. PATENT DOCUMENTS

| | | | | | |
|---|---|---|---|---|---|
| 1,545,771 | A | * | 7/1925 | Hout | 206/45.25 |
| 1,576,672 | A | * | 3/1926 | Miller | |
| 1,656,341 | A | * | 1/1928 | Smith | |
| 1,670,464 | A | * | 5/1928 | Marsh | |
| 1,902,566 | A | * | 3/1933 | Marsh | |
| 2,108,349 | A | * | 2/1938 | Rasmussen | 40/672 |
| 2,113,288 | A | * | 4/1938 | Berger | 206/45.25 |
| 2,283,406 | A | * | 5/1942 | Bacon | 248/174 |
| 2,290,144 | A | * | 7/1942 | Katz | 206/45.24 |
| 2,637,924 | A | * | 5/1953 | Hutt | 40/124.1 |
| 2,918,178 | A | * | 12/1959 | Leone | 211/72 |
| 4,234,148 | A | * | 11/1980 | Maddestra et al. | 248/174 |
| 4,610,363 | A | * | 9/1986 | Flum et al. | 211/73 |
| 4,770,379 | A | * | 9/1988 | Estvold | 248/174 |
| 4,940,199 | A | * | 7/1990 | Hall | 248/174 |
| 4,984,848 | A | * | 1/1991 | Scalisi et al. | 248/152 |
| 5,000,717 | A | * | 3/1991 | Pfeiffer | 248/174 |
| 5,297,677 | A | * | 3/1994 | Burian et al. | 248/174 |
| 5,454,180 | A | * | 10/1995 | Volpe | 40/539 |
| 5,632,390 | A | * | 5/1997 | Podergois | 211/195 |
| 5,868,367 | A | * | 2/1999 | Smith | 248/174 |

FOREIGN PATENT DOCUMENTS

| | | | | |
|---|---|---|---|---|
| FR | 2210317 | * | 5/1974 | 248/174 |

* cited by examiner

*Primary Examiner*—Jerry Redman
*Assistant Examiner*—Jennifer E. Novosad
(74) *Attorney, Agent, or Firm*—Pennie & Edmonds LLP

(57) ABSTRACT

A display unit having a front face and a structure for supporting the front face in a vertical position when the display unit is in a use position. The supporting structure has an assembly element extending from a pair of sides of the front face and being folded over the front face. The supporting structure also has a traction member adapted to connect between the assembly elements for asserting a traction force thereto. The traction member, after being connected to the assembly elements, is movable between the use position and a storing position. In the use position the traction member forces the assembly elements toward each other so that the front face assumes a convex shape. In the storing position the traction member is forced to extend so the convex front face resumes a flat shape for convenient storage.

16 Claims, 6 Drawing Sheets

FOLDING DISPLAY UNIT

FIELD OF THE INVENTION

The present invention relates generally to display units intended to provide visual information such as, for example, advertising information at a point of sale.

BACKGROUND OF THE INVENTION

Generally, display units of this type consist of a front face, carrying the visual information, intended to be placed on the ground. This front face can be held in a vertical position by means of a stand-type device formed by a wall held perpendicularly to the front face so that the display unit rests on the ground by means of at least three bearing points.

A cardboard display unit has already been proposed, for example in document FR-A-2,680,030, which is in the form of a vertical prism with concave or curved faces. It includes a front panel shaped by means of two rear sections braced at their free ends and adhesively bonded, respectively, to the borders of the front panel at the lateral edges. The sections are braced and locked by means of a snap-fit system. The front panel may comprise several parts which are folded on one another in order to prevent damage to the information provided on the visible face of the front panel.

A display unit of this type is relatively bulky and cannot be transported easily, and the manipulations required to arrange it in a use position or to fold it are not simple.

A display unit formed from a structure which can be folded flat and includes a vertical prismatic column and panels fixed on one face of this column is also known from document FR-A-2,650,907. The column includes three walls, two lateral walls being mounted pivotally about a fold line which is longitudinal with respect to a central wall which supports the panels. The two lateral walls are joined together by at least one elastic return means which stresses them towards each other. Their free longitudinal edge has a profile such that the two walls are able to abut against each other in the assembled position of the structure through the stress of the elastic means, projecting portions of one engaging in cutouts in the other, and vice versa.

This display unit has the same drawbacks as the previous display unit, namely it is fairly bulky and is complicated to manipulate. Moreover, manufacture of these display units requires adhesive bonding stages which lengthen the manufacturing process and which have a detrimental effect on the cost price of display units of this type. Furthermore, this display unit requires different materials and suitable packaging.

SUMMARY OF THE INVENTION

The present invention arises from this context and its object is to propose a display unit which can be folded so that it can be manipulated easily, is simple to use, i.e. to place in the use position and to fold, and which is simple and inexpensive to manufacture. Furthermore, the display unit according to the invention sets itself up automatically without an additional mechanism.

To this end, the subject of the present invention is a display unit including at least one front face forming a support for visual information and, when the display unit is in the use position, a structure for supporting the front face in the vertical position, it being possible to fold this structure flat, and including elastic return means, the front face being formed by at least two poster elements separated by a fold line.

According to the invention, the support structure consists of assembly elements in a single piece without adhesive bonding with the front face on either side of this front face, the assembly elements attaching to one side of the front face being stressed, when the display unit is in the use position, so as to abut on the assembly elements attaching to the other side of the front face via elastic return means.

According to one characteristic of the invention, the assembly elements are separated from the front face by a fold line and include means for attaching the elastic return means.

According to an advantageous embodiment, the assembly elements include at least one flap attaching to one side of the front face and of which a free edge abuts, when the display unit is in the use position, inside the fold formed between a tab attaching to the other side of the front face and this front face.

Preferably, the distance between the fold separating the flap from the front face and the free edge of this flap is shorter than the width of the front face.

It will be possible to see that at least one opening is made in the front face and/or in the support structure to receive a foot increasing the surface of the polygon for supporting the display unit.

According to another embodiment, the display unit includes two front faces, and the assembly elements include at least one flap attaching to each of the sides of each front face and of which a free edge abuts, when the display unit is in the use position, against the free edge of a flap attaching to the other side of the front face, a flap of a front face being juxtaposed with a flap of the other front face.

Preferably, the distance between the fold separating the flap from the front face and the free edge of this flap is shorter than half the width of the front face.

Provision may advantageously be made for the flap to attach, via its center to the front face, grooves being made between the flap and the front face on either side of the center of the flap, the elastic return means being received in these grooves and forming a loop between the flaps attaching on either side of the front face.

A display unit of this type may be produced, for example, from strong paper, cardboard or plastic.

BRIEF DESCRIPTION OF THE DRAWINGS

Further aims, characteristics and advantages of the present invention will become more clearly apparent from the following description of an exemplary embodiment given by way of illustration, with reference to the appended drawings, in which.

DESCRIPTION OF PREFERRED EMBODIMENTS

The embodiments which will be described relate, in a non-limiting manner, to display units obtained with the aid of sheets of cardboard or strong paper. Obviously, the sheets used may also be formed from a known flexible plastic material, such as PVC.

Figure 1:
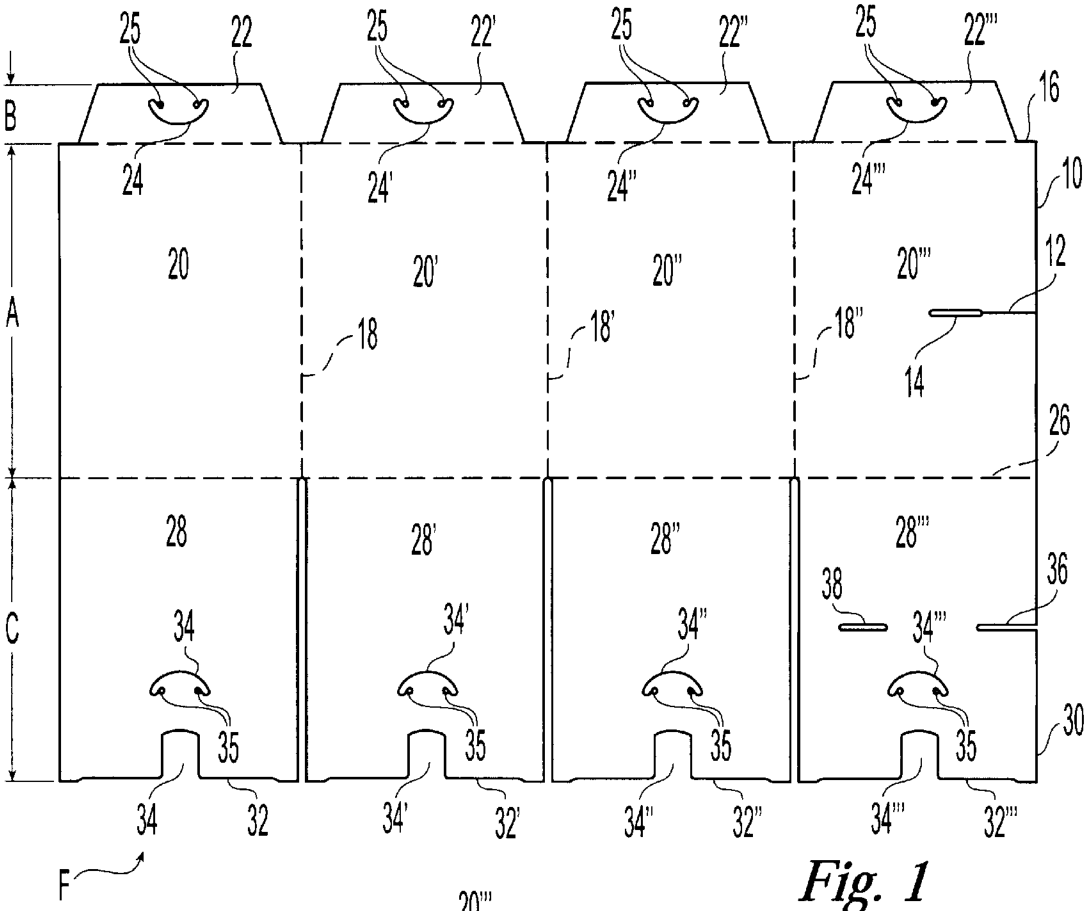
FIG. 1 shows a plan view of a sheet intended to form a display unit according to the invention.

With reference, now, to FIG. 1, a boarded sheet has been shown, denoted overall by the reference F, after cutting out and prior to assembly, and intended to form a display unit according to the present invention. In the various figures, the solid lines indicate cutting lines and the broken lines indicate folding lines.

The sheet F includes a central portion A intended to form the front face of the display unit and lateral portions B and C intended to form a supporting structure to support the display unit and to assemble it, these three portions A, B and C being in a single piece without adhesive bonding.

The portion A is generally rectangular, one of its small sides 10 being intended to be placed on the ground. A slot 12 is formed in the center of this small side 10, perpendicular to the side 10 and opening out in an opening 14, for example a rectangular opening, made close to the side 10.

Folds 18, 18', 18" are marked in the portion A to separate the latter in as many parts, such as poster elements, 20, 20', 20", 20'" as the number of folds formed, plus one unit.

One of the large sides 16 of the portion A is attached to tabs 22, 22', 22", 22'", formed in the center of the edge of the parts 20, 20', 20", 20'". These tabs 22, 22', 22", 22'" form the portion B. Cutouts 24, 24', 24", 24'" are formed substantially in the center of these tabs, for example in the form of an open O, the ends of which emerge, for example, in circular openings 25 intended to prevent any subsequent tearing. A fold line is formed along this side 16, between the parts 20, 20', 20" and 20'" and the tabs 22, 22', 22" and 22'".

The other large side 26 of the portion A is attached to these flaps 28, 28', 28", 28'", which are substantially rectangular, the small side of which is adjacent to the side 26 of the portion A and the large side 30 of which has a length which is shorter than that of the small side 10 of the portion A. Cutouts 34, 34', 34", 34'" are formed in the vicinity of the sides 32, 32', 32", 32'" of the flaps 28, 28', 28", 28'" opposite the side 26, for example in the form of an open O, of which the ends open out, for example in circular openings 35 intended to prevent any subsequent tearing. Grooves 134', 134", 134'" are made in the center of the sides 32, 32', 32", 32'" which a depth which is slightly greater than the distance separating the circular openings 25 of the free edge of the tabs 22, 22', 22", 22'".

A continuous fold is marked on the side 26, between the flaps 28, 28', 28", 28'" and the parts 20, 20', 20", 20'" of the portion A. Finally, a rectangular groove 36 may be made in the center of the large side 30 of one of the flaps located in the extension of the side 10 of the portion A, perpendicularly to this side 30, an opening 38, for example a rectangular opening, being made in the extension of this groove 36 in the vicinity of the bottom of this groove.

It can thus be seen that a sheet F of this type may be obtained very easily by means of a simple cutting operation which can be carried out simultaneously with an operation of marking of the folds.

Figure 2:
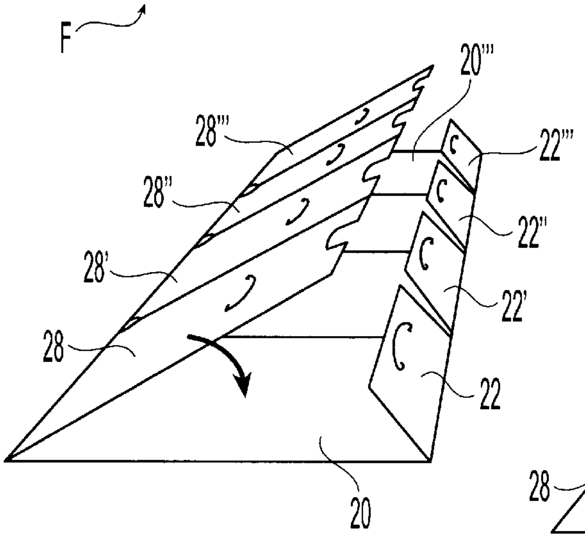
FIGS. 2 to 4 show different stages in manipulating the sheet of FIG. 1 to form the display unit according to the invention.
Figure 3:
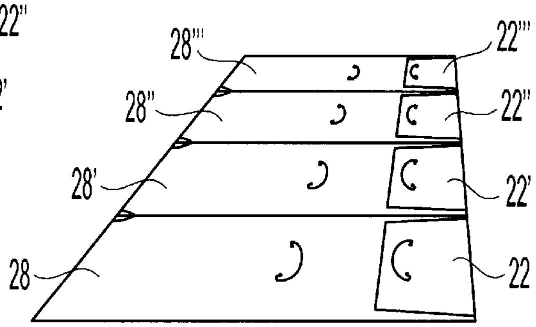

The display unit according to the present invention is then ready to be formed. To do this, the flaps 28, 28', 28", 28'" are first folded at 180° along the fold 26, in order to fold them over the parts 20, 20', 20", 20'" of the portion A. Next, the tabs 22, 22', 22", 22'" are folded at 180° in order to fold them over the flaps 28, 28', 28", 28'", as shown in FIG. 2, so as to obtain the display unit in the folded state, as shown in FIG. 3.

Figure 4:
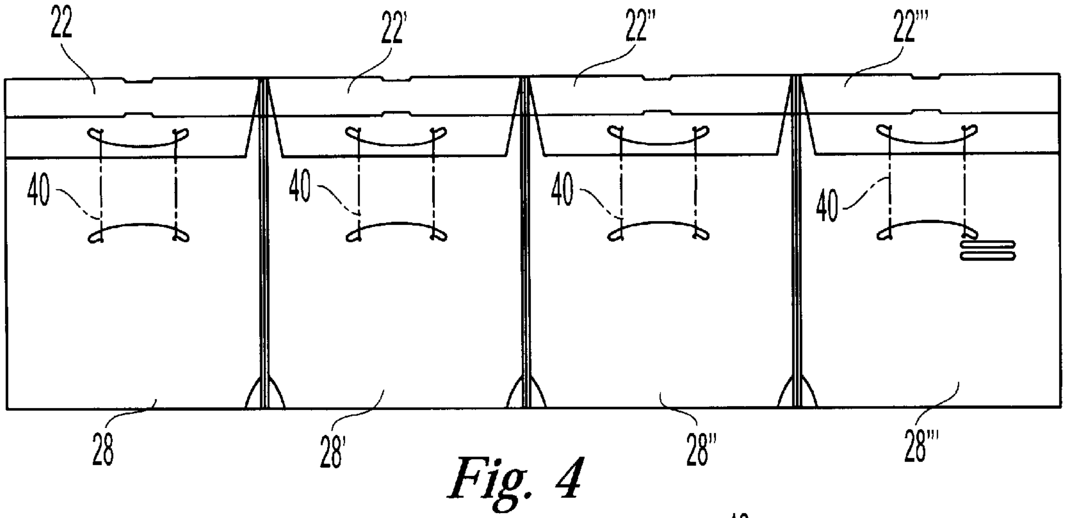

It then suffices to pass elastic bands 40 into the cutouts 24 and 34, 24' and 34', 24" and 34", 24'" and 34'", these elastic bands being housed in the circular openings 25 and 35, as shown in FIG. 4, the display unit being held flat.

Figure 5:
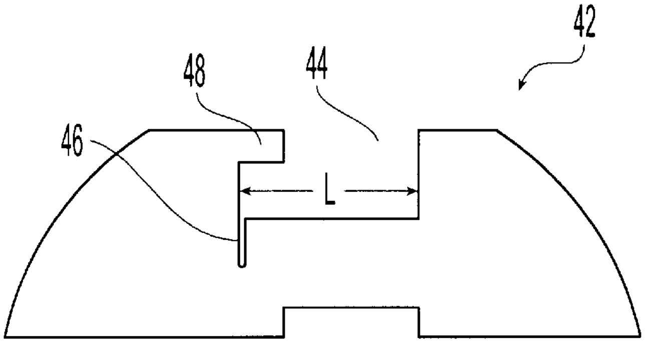
FIG. 5 shows a plan view of a sheet intended to form the foot of the display unit according to the invention.
Figure 9:
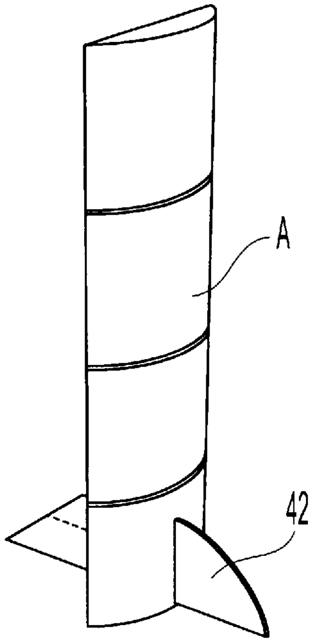
FIGS. 9 and 10 show perspective views, front three quarters and rear three quarters, of the display unit of FIG. 7.
Figure 10:
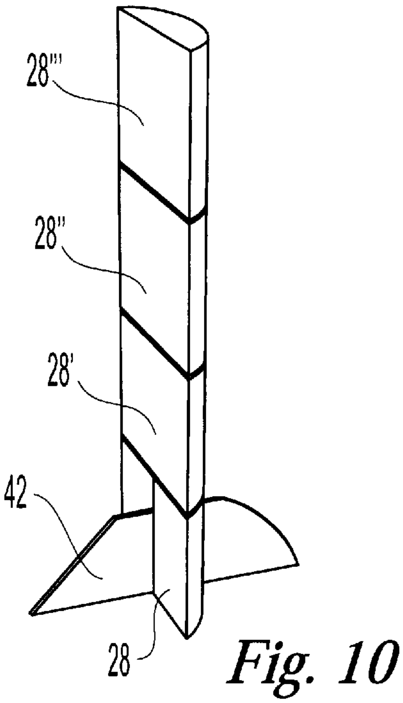

It also suffices to provide a foot 42 for the display unit, for example like that shown in FIG. 5. A foot of this type is of general rectangular shape and may advantageously consist of a sheet folded in two along one of the large sides of this rectangle to make it stiffer. A notch 44 is made on one of the large sides of this rectangle, this notch 44 itself including a groove 46 intended to interact with the opening 14. A spur 48 is formed in the foot 42, extending into the notch 44, and intended to interact with the opening 38 so as to hold the foot 42 in place.

Figure 6:
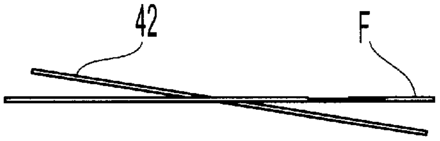
FIG. 6 shows a side view of the display unit obtained with the sheet of FIG. 1, equipped with the foot of FIG. 5, in the folded position.
Figure 8:
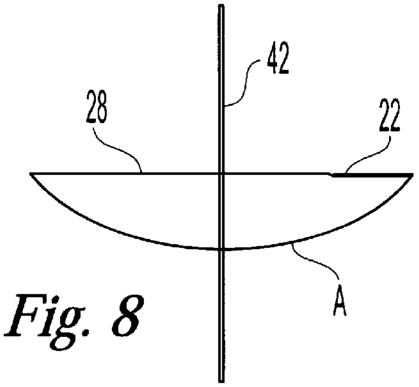
FIG. 8 shows a top view of the display unit of FIG. 7.
Figure 7:
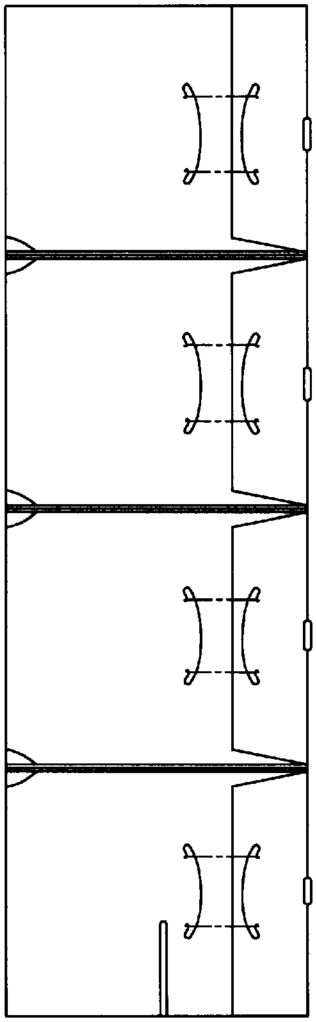
FIG. 7 shows a rear view of the display unit according to the invention, in the unfolded position.

The slot 12, associated with the opening 14 on the one hand and the groove 36 associated with the opening 38 on the other, being arranged in the center of the part 20'" and of the flap 28'", respectively, this part 20'" and this flap 28'" being of different lengths, it will thus be understood that, in the flat position of the display unit shown in FIG. 4, the plane of the foot 42 adopts a position which is substantially parallel to that of the folded sheet F forming the rest of the display unit, as shown in FIG. 6.

Figure 12:
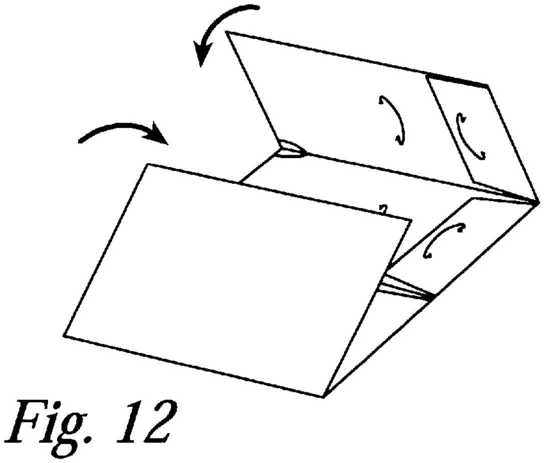
FIGS. 12 and 13 show various stages in the folding of the display unit of FIG. 7.
Figure 11:
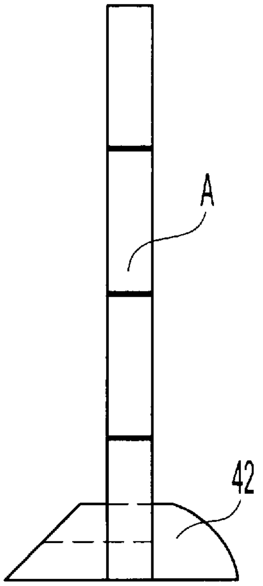
FIG. 11 shows a side view of the display unit of FIG. 7.
Figure 13:
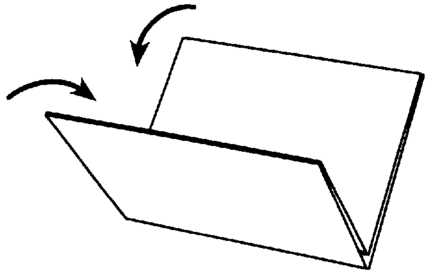
Figure 15:
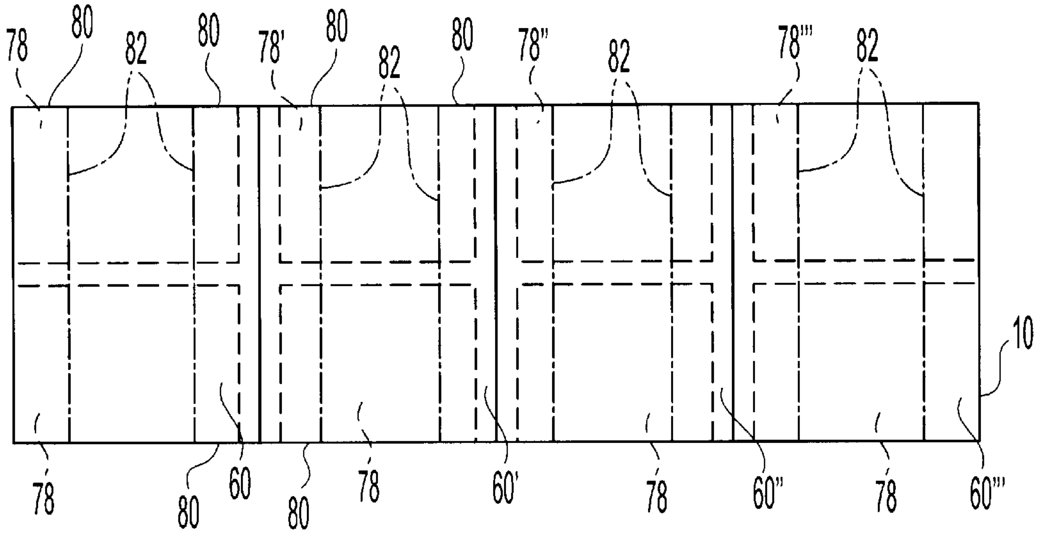
FIG. 15 shows a front view of the display unit obtained with the sheet of FIG. 14.
Figure 14:
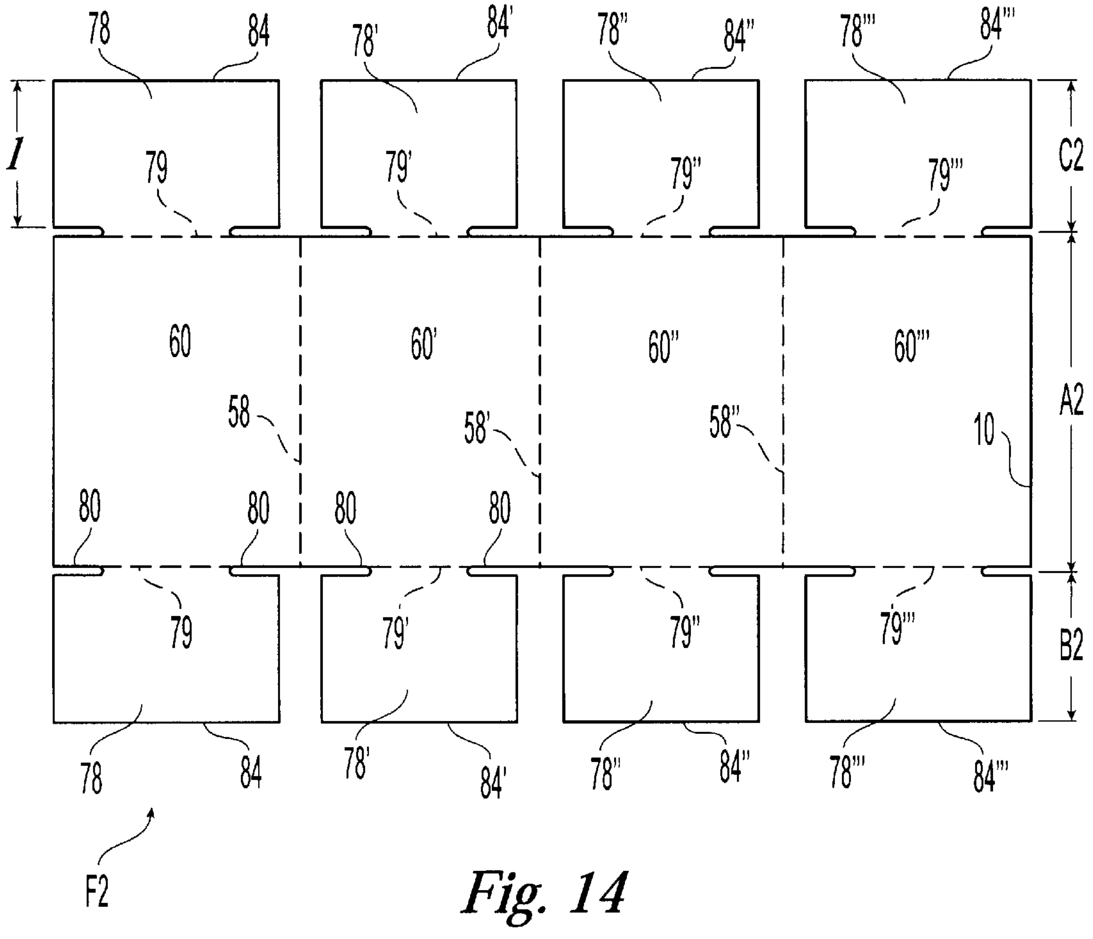
FIG. 14 shows a plan view of a sheet intended to form a display unit according to a variant embodiment of the present invention.

It is then possible to fold the display unit, equipped with its foot 42, along the folds 18 and 18", as shown in FIG. 12, then to fold it along the fold 18', as shown in FIG. 13, so that the display unit according to the present invention is as compact as possible.

The desired visual information will, of course, have been placed on the front face formed by the portion A beforehand, for example by printing at the same time as or after the operation of cutting and forming the fold lines.

The display unit according to the present invention may then be used whilst occupying only a small space, for example in order to be stored or stacked. It may also easily be sent by post, since its thickness, dimensions and weight easily allow this.

When the display unit according to the present invention has to be used, for example when an end user has received it by post, this operation is carried out very simply. To this end, it then suffices to unfold it, in the opposite direction from the arrows in FIG. 13, then to hold the end of the display unit opposite that which is to rest on the ground. A single reference means may preferably be affixed to the visible face of one of the flaps which are then apparent if the visual information, for example text, on the front face of the display unit is insufficient to determine the orientation of the unit.

By then releasing the rest of the display unit, it is then deployed about the folds 18, 18' and 18" under gravity. Simultaneously, the elastic bands 40 exert a traction force between the openings 25 and 35. The result of this traction force is to stress these openings towards one another until the edges 32, 32', 32" and 32'" abut on the inner fold formed on the side 16 between the parts 20, 20', 20" and 20'" and the flaps 22, 22', 22" and 22'".

The front face A then assumes a convex shape, as shown in FIGS. 8 to 11. The width L of the notch 44 of the foot 42 is, naturally, determined so as to correspond to the deflection of the front part A relative to the flaps 28, 28', 28", 28'" in this unfolded position. The display unit may then be placed on the ground or on a piece of furniture, depending on its size and/or its intended purpose. It then retains its shape by virtue of the action of the elastic bands 40 and is held in a vertical position by the foot 42 which confers on it a particularly stable equilibrium.

A display unit for visual information which is particularly simple to manufacture without prohibitive costs and extremely easy to use is thus obtained according to the invention. Indeed, the display unit just described automatically assumes its use form with no manipulation other than having to be gripped via its upper end.

In the same way, when use of the display unit according to the present invention is no longer justified, it is very easy for the user to store it. It suffices for the user then to place it flat again, separating the edges of the front face A, to arrive at the configuration shown in FIG. 4. In this operation, owing to the respective position of the slot 12, associated with the opening 14 on the one hand, and of the groove 36 associated with the opening 38 on the other, the foot 42 automatically resumes the position shown in FIG. 6, in which its plane becomes parallel to the plane of the front face A.

The user has then only to fold the display unit along the folds 18 and 18", as will be seen in FIG. 12, then to fold it along the fold 18', as will be seen in FIG. 13, to make the display unit as compact as possible.

A display unit which is very easy to manufacture at low cost has thus indeed been produced according to the present invention. This display unit can be folded easily in order to minimize the overall size during a period of non-use, particularly for sending by post. Manipulation of this display unit, to arrange it in the use position or to fold it, is particularly easy to achieve.

Figure 18:
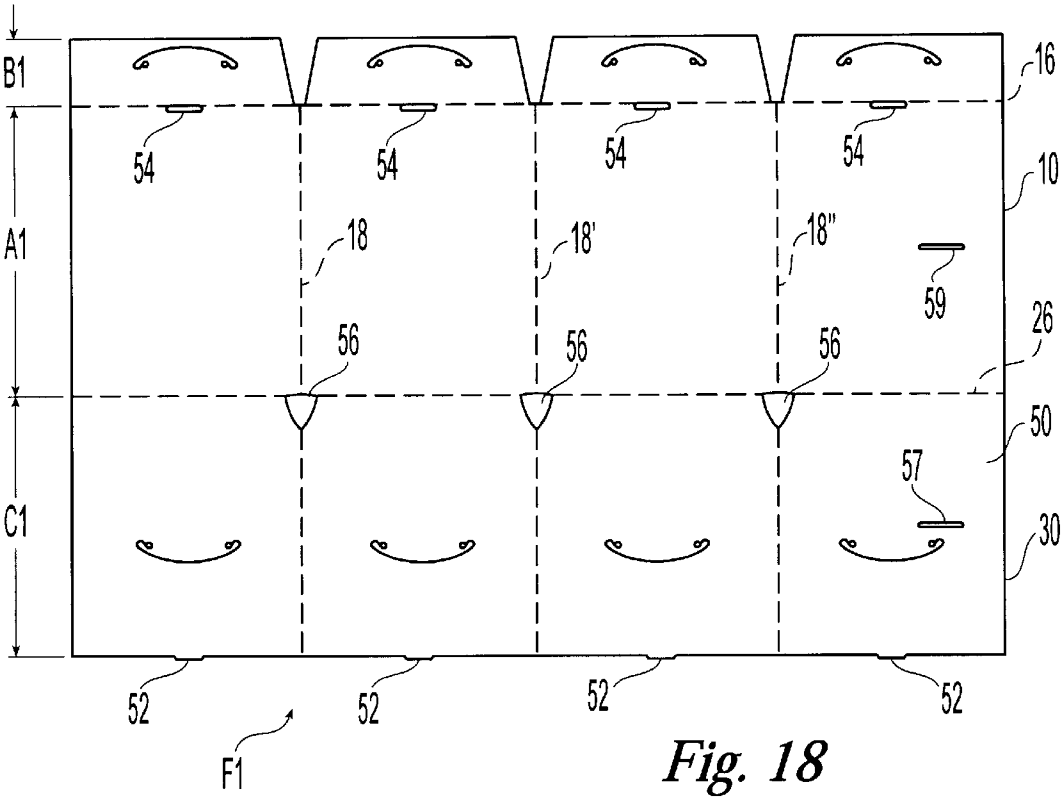
FIG. 18 shows a variant embodiment of the sheet of FIG. 1.

The width, length and height of the display unit may be chosen freely as a function of the visual information which it is desired to communicate, without significant change to the structure just described. However, in the case of display units which are relatively tall, for example taller than one meter, preference may be given to the sheet F1 according to the variant embodiment shown in FIG. 18.

According to this variant, the portion C1 of the sheet F1 no longer consists of individualized flaps but of a single flap 50 in a single piece without adhesive bonding with the front face A1. The folds 18, 18', 18" then extend into the flap 50. In this way, when the display unit is in the unfolded use position, the flap 50 interacts with the front face A1 to stiffen the assembly. In this case, provision may advantageously be made to equip the flap 50 with tongues 52 intended to penetrate the slots 54 made in the fold 16 so as to improve the non-deformable nature of the assembly in the unfolded use position. Provision may also be made for there to be openings 56 at the intersection of the fold 26 with folds 18, 18' and 18", so as to facilitate folding of the display unit.

Figure 19:
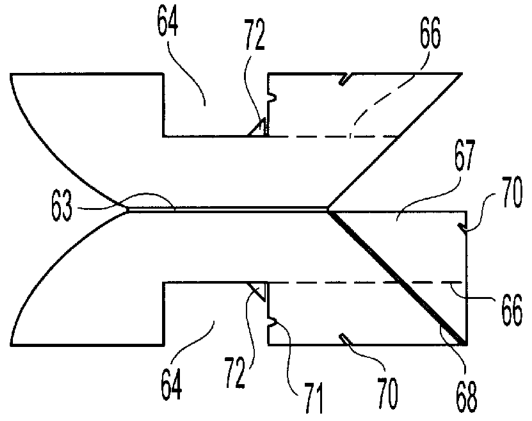
FIG. 19 shows a plan view of a sheet intended to form a variant embodiment of the foot of the display unit.
Figure 20:
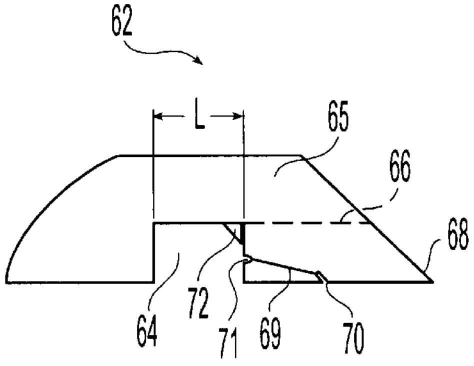
FIG. 20 is a plan view of the foot obtained with the sheet of FIG. 19.

Use may then be made, for a larger structure of this type, of a reinforced foot 62 such as that shown in FIG. 20 which is obtained with the sheet shown in plan in FIG. 19. The foot 62 is intended to interact with rectangular openings 57 and 59, which are identical and are made in the portion C1 and in the front face A1, respectively, near to their edge 30 and 10, respectively.

The foot 62 is obtained by folding the two parts of the sheet shown in FIG. 19 around the central fold 63 so as to have a general oblong shape. The foot 62 also has a notch 64, the length L of which is substantially equal to the deflection of the front part A1 relative to the flap 50 in the unfolded position of the display unit. A part 65 of the foot 62 is formed with a fold 66 so that this part 65 can be folded temporarily in order to penetrate the openings 57 and 59. Once the part 65 has gone beyond these two openings, it may be deployed in order to adopt the configuration shown in FIG. 20.

Provision may advantageously be made for a part 67 to be itself folded about a fold 68 in order to join the two halves of the foot 62 and thus to make it stiffer. The cohesion of the assembly may then be ensured by means of an elastic band 69 passing into the notches 70 and 71 of the part 65. A spur 72, which is itself also foldable, in order to be able to pass through the openings 57 and 59, may be provided so that, after deployment, it forms a groove in which the front face A1 or, preferably, the flap 50, is housed.

FIGS. 14 to 17 show another variant embodiment of a display unit according to the present invention. According to this variant, the display unit is obtained with the aid of two sheets, such as F2, only one of these sheets being shown in FIG. 14, the other being identical to it. In FIGS. 14 to 17, elements which are identical or equivalent to those in figures previously described have been given the same reference numeral.

As in the previous embodiment, the sheet F2 includes a central portion A2 intended to form a front face of the display unit and lateral portions B2 and C2 intended to assemble the display unit, these three portions A2, B2 and C2 being in a single piece without adhesive bonding.

The portion A2 is of general rectangular shape, one of its small sides 10 being intended to be placed on the ground or on an item of furniture.

Folds 58, 58', 58" are marked in the portion A2 to separate the latter into as many parts 60, 60', 60", 60'" as the number of folds formed, plus one unit.

The portions B2 and C2 are identical and consist of flaps 78, 78', 78", 78'", which are substantially rectangular, each having a side which is adjacent, via its center 79, 79', 79", 79'", to one of the large sides 26 of the portion A2, so as to form grooves 80 between the flaps 78, 78', 78", 78'" and the front face A2, circular openings being formed in the bottom of these grooves 80 to prevent any subsequent tearing thereof. A fold mark is formed in the central parts 79, 79', 79", 79'".

The length 1 of the flaps 78, 78', 78", 78'", i.e. the distance between the fold mark 79, 79', 79", 79'" and the free edge of these flaps, is shorter than half the width of the front face A2, i.e. shorter than the length of the side 10.

It will thus be seen that a sheet F2 of this type may also be obtained very easily by a simple cutting operation which may be carried out simultaneously with an operation for marking the folds 58, 58', 58'', 58''' and 79, 79', 79'', 79'''.

The display unit according to this variant is thus ready to be formed. To do this, the flaps 78, 78', 78'', 78''' are first folded at 180 degrees along the folds 79, 79', 79'', 79''' to fold them over the parts 60, 60', 60'', 60''' of the portion A2, on each side of the latter. This same operation is carried out on a second sheet, which is not shown but which is identical to the sheet F2, the elements of this sheet F2' being identified by the same reference numerals increased by one hundred.

The sheet F2' is then arranged on the sheet F2 so that the front faces A2 and A2' are outside this assembly, the flaps 78, 78', 78'', 78''' of one of the sheets being in contact with the corresponding flaps 178, 178', 178'', 178''' of the other sheet.

Elastic bands 82 are then passed into the grooves 80 and 180 adjacent to the two sheets F2 and F2', these elastic bands being housed in the circular openings in the bottom of the grooves 80 and 180. These elastic bands are arranged so as to form a loop between the flaps attaching to one and the same sheet.

It is then possible to fold the display unit produced according to this variant by pressing the front faces A2 and A2' against each other, then folding the assembly along the fold lines 58, 58', 58'', 58''' so that the display unit is as compact as possible and can, for example, be easily stored, stacked or sent by post.

The desired visual information will, of course, have been placed on the front faces formed by the portions A2 and A2' beforehand, for example by printing at the same time as or after the operation of cutting and forming the fold lines.

When the display unit according to this variant has to be used, for example when an end user has received it by post, this operation is carried out very simply. To this end, it then suffices to grip it via its end opposite that which is to rest on the ground or on an item of furniture, this end being referenced by a simple means.

By then releasing the rest of the display unit, it is then deployed about the folds 58, 58' and 58'' under gravity. Simultaneously, the elastic bands 82 exert a traction force between the openings located in the bottom of the grooves 80 and 180 on either side of the front faces A2 and A2'. The result of this reaction force is to stress these openings towards one another until the free edges 84, 84', 84'' and 84''' and 184 abut against one another by virtue of the loop formed by the elastic bands 82, as will be seen in FIG. 17.

Figure 16:
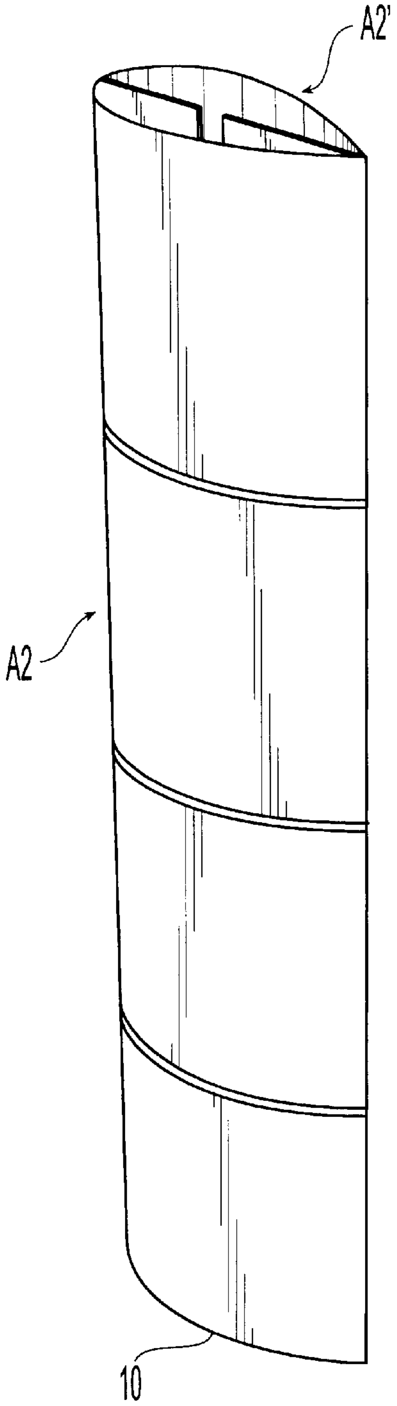
FIG. 16 shows a perspective view of the display unit of FIG. 15.
Figure 17:
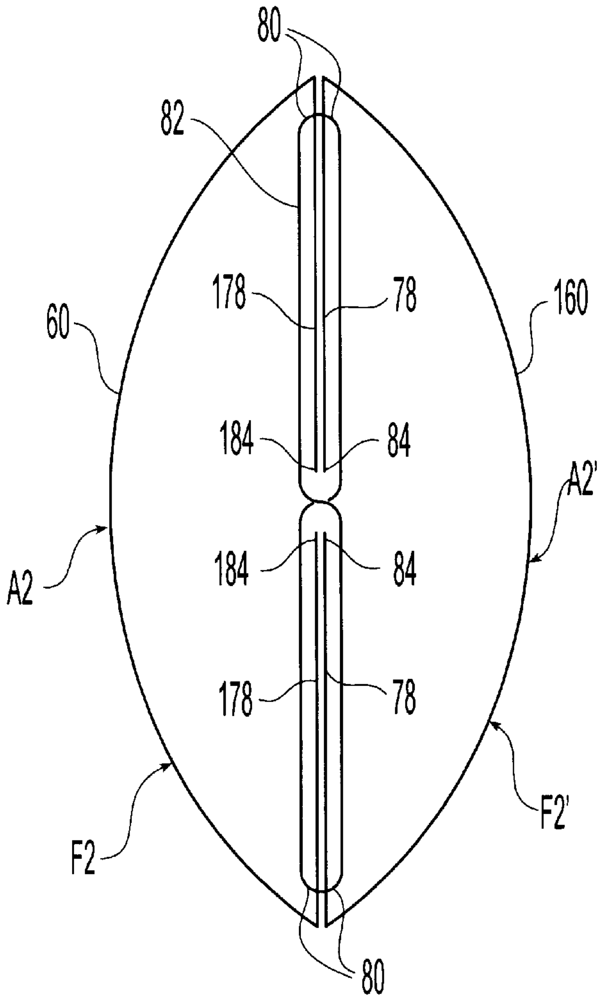
FIG. 17 shows a top view of the display unit of FIG. 15.

The front faces A2 and A2' then assume convex shapes, as shown in FIGS. 16 and 17, the sum of the lengths of the flaps 78 and 178, which are then adjacent, being smaller than the width of the front faces A2 and A2'.

It will, moreover, be seen that, according to this variant embodiment, there is no need to arrange a foot for the display unit, the latter having a support polygon which is sufficient itself to ensure the stable equilibrium of the display unit.

A display unit for visual information is thus obtained according to this variant, which is even simpler to manufacture at lower cost and even simpler to use. As in the preceding embodiment, the display unit just described automatically assumes its use form with no manipulation other than being gripped by its upper end.

In the same manner, when the user no longer wishes to use the display unit, it is very easy for him to store it. It then suffices for him to place it flat again, separating the edges of the front faces A2 and A2' or to exert a pressure on these two faces in order to flatten the display unit again. The user then has only to fold the display unit along the folds 58, 58' and 58'' to make it as compact as possible once again.

A display unit which can be manufactured very simply at low cost and which is particularly easy to manipulate has thus indeed again been achieved according to this variant.

As has been seen above, the width, length and height of the display unit may be chosen freely as a function of the visual information which it is desired to present, without significant change to the structure just described. A display unit of this type may favorably be printed on both sides.

Of course, the invention is not limited to the embodiments which have been described but may, on the contrary, be modified in numerous ways which will become apparent to a person skilled in the art. It is thus, for example, that the number of tabs or of flaps may be different from the number of tabs and flaps shown in the figures, depending on the desired height of the display unit and/or on the nature of the visual information to be communicated.

For example, the display unit according to the invention may dispense with the foot and may be suspended.

In another example, the display unit may be produced by means of two cardboard sheets, particularly when it is very wide.

What I claim is:

1. A display unit comprising:

a front face comprising a pair of sides; and a supporting structure for supporting the front face in a vertical position when the display unit is in a use position, the supporting structure comprising:

an assembly element extending from at least a portion of each of said pair of sides of the front face, said assembly element being foldable over the front face; and a traction means connected between the assembly elements for asserting a traction force thereto;

wherein the traction means is movable between the use position and a storing position after the traction means is connected to the assembly elements;

wherein when the display unit is in the use position the traction means forces the assembly elements toward each other so that the front face assumes a convex shape, and when the display unit is in the storing position the convex front face resumes a flat shape for convenient storage.

2. The display unit according to claim 1, wherein the assembly elements partially overlap with each other when the display unit is in the storing position.

3. The display unit according to claim 1, wherein the assembly elements overlap at least a portion of the front face when the display unit is in the storing position.

4. The display unit according to claim 1, wherein each assembly element comprises a flap foldable over the front face to form an inner fold therebetween, each of the flaps comprising a free edge remote from the corresponding side; and wherein one of the free edges abuts against the inner fold formed on the other side of the front face, when the display unit is in the use position.

5. The display unit according to claim 4, wherein each flap has a length between the free edge and the corresponding side, and wherein the front face has a width between the pair of sides, the length of each flap being shorter than the width of the front face.

6. The display unit according to claim 5, wherein each assembly element defines a groove for receiving a portion of the traction means.

7. The display unit according to claim 6, wherein the groove is defined between the assembly element and the front face.

8. The display unit according to claim 1, wherein the traction means is an elastic band.

9. The display unit according to claim 1, wherein at least one of the front face and the assembly elements defines an opening for receiving a foot support.

10. The display unit according to claim 1, wherein the front face comprises a plurality of poster elements joined by a fold line, each poster element being supported by a supporting structure.

11. The display unit according to claim 1, wherein at least one of the front face and the assembly elements is made of a material selected from the group consisting of strong paper, cardboard, and plastic.

12. The display unit according to claim 1, wherein each assembly element comprises a flap comprising a free edge remote from the corresponding side, the free edges abutting against each other, when the display unit is in the use position.

13. The display unit according to claim 1 wherein the front face comprises first and second front faces, and the supporting structure comprises first and second supporting structures for supporting the first and second front faces, respectively;

wherein the assembly elements of the first front face are juxtaposed with and joined to the assembly elements of the second front face.

14. The display unit according to claim 13, wherein each assembly element comprises a flap comprising a free edge remote from the corresponding side, the free edges corresponding to the same front face abutting against each other, when the display unit is in the use position.

15. The display unit according to claim 14, wherein each flap has a length between the free edge and the corresponding side, all of the flaps having the same length.

16. The display unit according to claim 15, wherein the front face has a width between the pair of sides, the length of each flap being shorter than half of the width of the front face.

* * * * *